March 24, 1959     W. H. DOHERTY ET AL     2,879,183
INSULATING COATINGS AND A METHOD FOR THEIR PRODUCTION
Filed Dec. 15, 1955

INVENTORS   W. H. DOHERTY
R. C. PLATOW

BY Edwin B. Cave
ATTORNEY

United States Patent Office 2,879,183
Patented Mar. 24, 1959

2,879,183

INSULATING COATINGS AND A METHOD FOR THEIR PRODUCTION

William H. Doherty, Summit, N.J., and Raymond C. Platow, Westport, Conn., assignors to Bell Telephone Laboratories, Incorporated, New York, N.Y., a corporation of New York Application December 15, 1955, Serial No. 553,330

2 Claims. (Cl. 117—217)

This invention relates to a method of insulating electrical conductors, and relates particularly to a method for perfecting the insulating properties of imperfect organic insulating films with a supplemental inorganic insulating coating. This invention also relates to electrical conductors coated by the aforementioned methods.

In the manufacture of some devices useful in the communications art, it is desirable to cover metallic conducting materials with thin films of organic insulating materials. For example, the article "Reduction of Skin Effect Losses by the Use of Laminated Conductors," by A. M. Clogston, published in the Proceedings of the Institute of Radio Engineers, volume 39, page 767, in 1951, discusses low-loss transmission lines constructed in part of alternating thin laminae of conductors and insulators. Some experimental difficulties have been met in the construction of such transmission lines, and other devices, which difficulties arise from the coating of surfaces with thin films of insulating organic materials. A new technique for perfecting such thin insulating coatings is discussed herein.

Figure 1:
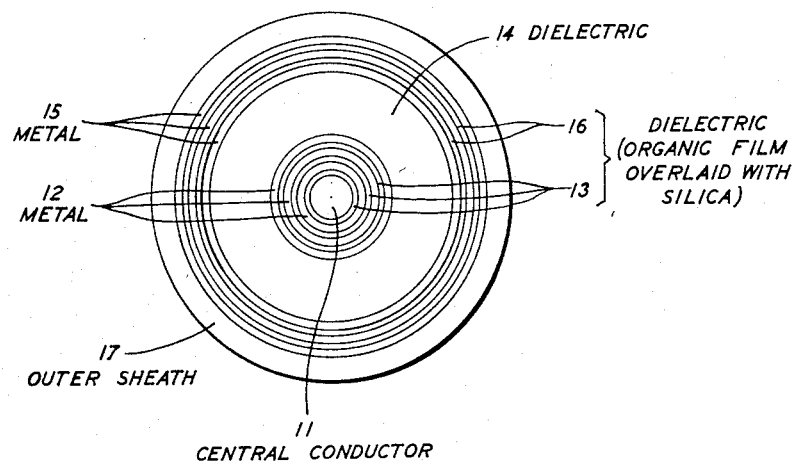

Fig. 1 is a sectional view of a laminated conductor constructed by the principles disclosed in the aforementioned article by A. M. Clogston; and Fig. 2 is a front view, partly in section, of the conductor in Fig. 1, in which the laminated construction is again apparent.

Figure 2:
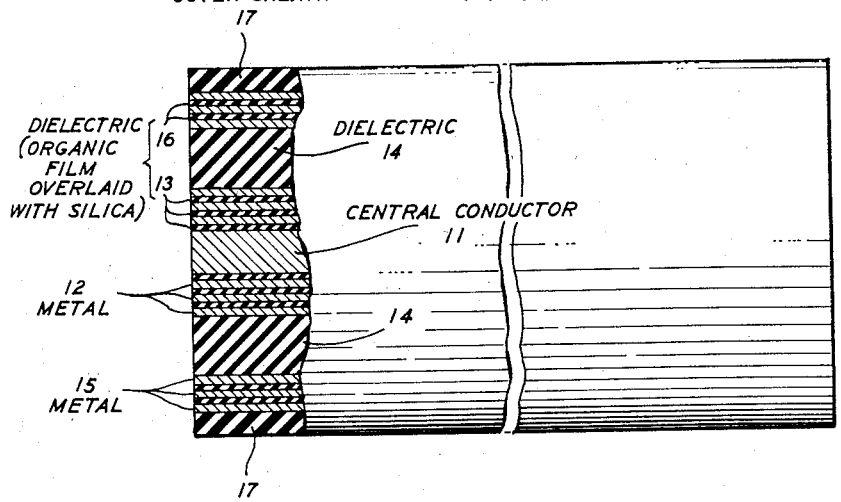

In Figs. 1 and 2, a central conducting core 11 is surrounded by alternate thin layers of metal 12 and an insulating dielectric 13 to compose an inner conductor assembly. A main dielectric 14 separates the inner assembly from a comparable outer conductor assembly formed of similar thin laminations of metal 15 and an insulating dielectric 16. An outer sheath 17 of a protective insulating material surrounds the outer conductor. The optimum thickness of layers 12 and 15 of metal and of layers 13 and 16 of dielectric can be determined, for a given frequency of the electromagnetic wave to be transmitted, from the values of the conductivity of the metal and the dielectric constant of the insulator used in the construction of the transmission line by reference to theoretical considerations on the nature of conduction in such laminated structures. Such considerations are presented in the aforementioned publication of A. M. Clogston. Generally, the films will preferably have thicknesses between about 0.01 mil and about 0.1 mil, though thicknesses as large as 0.25 mil are possible for some devices.

In practice, such thin films of metal as are required in the construction of laminated conductors may be deposited by, for example, vapor phase depositions. Similarly, known techniques may be used to lay the alternating thin laminae of insulating material. One such method, in which a film of polystyrene is laid on a metallic substrate, involves the application of polystyrene from a solution of polystyrene in benzene or toluene. Other organic materials with the dielectric properties wanted may be used as the insulating laminae, though polystyrene has proved a particularly excellent example.

In the application of insulating organic films of the desired thickness, voids or breaks in the continuity of the film sometimes result. Such breaks may be formed in the film surface, for example, by irregularities in the surface being covered, such as sharp non-uniform projections of metal standing above the remainder of the metal surface. Foreign occlusions in the coating or local characteristics of some surface areas which resist wetting can also give rise to voids or non-coated areas. These anomalies in the surface, and the anomalies subsequently produced in the coating films are, to be sure, usually microscopic. Nevertheless, the insulating qualities of the organic films can be adversely affected by the presence of these voids. A single short-circuit between metallic films, even over a very small area, can have serious effects.

Though the application of further thicknesses of the organic insulation may be used to remedy the defects of earlier coatings, the whole film, if built up in this manner, tends to become objectionably thick. The technique of laying thin organic films is a difficult one: multiple coating to correct earlier defects in coverage is not a preferred process if the overall depth of the resultant layers of organic material is to be at a minimal value.

The present invention describes a more acceptable technique for filling the voids possibly to be found in such thin organic insulating films. The method contemplates the formation, on the organic film, of a very thin supplemental overcoating film of an adhesive form of silica. Such silica films cover underlying voids with an insulating layer, and are more easily and conveniently applied in thin layers than are secondary organic coatings. The inorganic films also have greater rigidity and toughness than do films of similar thickness of many organic materials. Greater protection is thus afforded against possible piercing of the dielectric film covering sharp irregularities projecting above the normal metal film surface, for example.

The silica film, deposited over the irregularities of the underlying organic material, is originally deposited as colloidal hydrated silica or silicic acid from a hydrolyzed solution of an organic silicate such as ethyl silicate. A plasticizer is admixed with the solution to lend flexibility to the deposited silica films. A coupling agent serves to emulsify the normally water-immiscible organic silicate into a stable solution with aqueous components. An acid, also included in the mixture, is the catalyst for the hydrolysis.

The hydrolysis of organic silicates, such as tetraethylorthosilicate, is catalyzed by a number of common inorganic acids, such as nitric, hydrochloric, or sulfuric acids, for example. The use of solutions containing such acids as coatings for metal wires or partially coated metal wires is not always advisable, however. The presence of unreacted acids may be detrimental to the metal substrates being coated or to layers of metal later applied over the silica film. Even where microscopic defects in acid resistant organic coatings, such as the polystyrene films mentioned elsewhere herein, are the only access to unprotected metal, corrosion of the metal may possibly be initiated by an attempt to deposit silica over the defects with solutions containing acids as strong as those mentioned.

However, as noted in Patent 2,692,838, issued October 26, 1954, to Elmer A. Thurber, formic acid can be used as an acid hydrolyzing agent in solutions of colloidal silica with success. The patent mentioned above discloses that formate ions residual in dried silica coatings are not as reactive with finely divided metal particles in, for instance, coated electron discharge tubes, as are chloride ions left when hydrochloric acid is used to hydrolyze the colloidal silica solution used as a binder for the coating particles. Now, it has also been found that such formic acid solutions are not corrosive to portions of a metallic substrate partially protected with acid resistant materials when colloidal silica solutions are used to coat the whole with silica.

The organic silicates, such as tetraethylorthosilicate and others, which are hydrolyzed by the acid are not normally compatible with the aqueous acid solutions. A water soluble organic material is added to the two component system to homogenize it. Convenient and economical coupling agents are the low molecular weight alcohols such as methanol, ethanol, propanol or isopropanol. By solubilizing the aqueous acid in the organic silicate, the hydrolysis of the latter is speeded.

Generally, to prevent over-dilution and thinning of the mixture, only sufficient coupling agent is added to emulsify the otherwise immiscible components. If too little of the coupling agent is used, the rapidity of the hydrolysis reaction may be impaired. Examples of suitable compositions follow later herein.

Solutions containing an organic silica, acid, and a coupling agent as the only ingredients are usually less satisfactory for use in the coating techniques of the present invention than are such solutions which also contain a plasticizer. The films deposited from solutions without a plasticizer may tend to be brittle. When applied to a relatively flexible coated wire, later movement of the wire may cause flaking or peeling of the thin silica coat. This defect may be remedied by adding an organic material with plasticizing properties to the solution.

Among the plasticizers which can be successfully used for this purpose are "Cellosolve," made by Carbide and Carbon Chemicals Company (2-ethoxyethanol), methyl Cellosolve (methoxyethanol), butyl Cellosolve (2-butoxyethanol), and Cellosolve acetate (hydroxyethylacetate).

In the solutions used to deposit silica, the water content is purposely kept below that stoichiometric value at which complete hydrolysis of the organic silicate would occur on mixing. The amount of acid is also so chosen that the rate of hydrolysis, as determined by the presence of this catalyst, is sufficiently low that complete hydrolysis does not occur during the aging period, after mixing, when the solution may be exposed to atmospheric moisture. These precautions assure that hydrolysis, in normal practice, will be completed only after the solution has been applied to the substrate as a coating film. Hydrolysis under this latter condition produces an adherent coating of silica on the substrate, presumably by affecting the process of crystal growth and by affecting the size of the deposited crystals. If hydrolysis is complete in solution, before application of the solution as a coating film, the resultant silica deposits are usually not as adherent to the substrate.

Because of the small quantities of acid which are used in the coating mixtures, relative to the quantities of other ingredients used, a dilute solution of formic acid is generally used as the hydrolyzing agent. A solution of 0.5 normal acidity has been found most convenient in formulating the coating compositions.

Exemplary of the solutions which can be used to deposit silica films over substrates of organic materials to remedy defects in the latter coating are the following specific compositions:

*Example 1*

| Component: | Parts by volume |
|---|---|
| "Cellosolve," made by Carbide and Carbon Chemicals Company | 20 |
| Isopropanol | 25 |
| Tetraethylorthosilicate | 7.5 |
| 0.5 N formic acid | 1 |

*Example 2*

| Component: | Parts by volume |
|---|---|
| "Cellosolve" made by Carbide and Carbon Chemicals Company | 10 |
| Isopropanol | 20 |
| Tetraethylorthosilicate | 10 |
| 0.5 N formic acid | 1 |

Solutions whose compositions are within the following general limits can be used successfully in the practice of the invention:

| Component: | Parts by volume |
|---|---|
| Plasticizer | 8–22 |
| Coupling agent | 18–27 |
| Organic silicate | 5–12.5 |
| Formic acid 0.5 N | 0.75–1.25 |

In the preparation of any of the solutions mentioned above, the components of the solution are combined and agitated sufficiently to emulsify the mixture and initiate hydrolysis. The mixtures are then permitted to stand for two days before use. During this period the hydrolysis of the organic silicate continues. After the aging period, the solution will be stable for an interval of at least 100 hours.

Application of the solution as a film may be by dipping, brushing, or spraying, for example. When wires are coated, a continuous dipping process has proved efficient. Multiple dips for the application of several thin layers of silica can be easily achieved by simple engineering modifications.

After application of the solution to a substrate, the evaporation of volatile components and the completion of the hydrolysis is conveniently effected by exposure to atmospheric moisture during air drying, either at room temperature or at an elevated temperature. Exposure of thin films to the atmosphere and acceleration of the reaction by heat complete the hydrolysis of the organic silicate in situ. When successive coats of silica are to be applied in fairly rapid succession, drying the coats between applications with electric infra-red lamps has been employed with good results. While elevated temperatures are not detrimental to the deposited silica films themselves, not so high a temperature should be used that the organic undercoating or substrate is damaged. There should certainly be no charring or blistering of any of the organic materials associated with the process. Temperature control of the drying is easily regulated by consideration of the specific materials involved. If heat sensitive substances are present, longer periods of drying at lower temperatures may be employed.

A simple check on the efficacy of the coating process may be made, at least when wires are being treated, by passing the electrified wire through a mercury drop. The mercury drop is biased electrically with respect to the insulated or partially insulated wire. If a defect in the organic insulating coating is present, the electrical circuit is completed through the defect and suitable indicating devices in the circuit can be thereby activated. After treating the defective wire with one or more coats of deposited silica, the wire may be rechecked for defects by the same technique.

A process comprising ten dippings of a polystyrene coated wire into a silica solution in the composition range given earlier, with air drying at 100° C. between successive dippings, will deposit a flexible adherent silica coat approximately 0.05 mil in thickness on the organic substrate. Such a coating has been found adequate to remedy voids and defects in the underlying polystyrene coat. If a laminated structure is being developed, the next succeeding metallic layer may now be deposited over the silica coated insulating layer. Further layers of insulating organic material coated with silica, alternating with conducting metal layers, can be built up.

The specific embodiments of the invention herein disclosed are intended to be illustrative only, and should not be construed as limiting the scope and spirit of the invention.

What is claimed is:

1. The method of making a laminated electrical conductor which comprises coating a metallic conductor with a polymeric organic electrically-insulating material suitable for wire insulation, covering said coating with at least one film of an acidified aqueous solution comprising colloidal hydrated silica and a water-soluble coupling agent consisting of a low-molecular-weight alcohol, said solution being non-reactive with metallic portions of the laminated conductor, drying said film between successive applications, whereby said film is converted to a coating of an adherent form of silica which overlays voids in the organic electrically-insulating coating thereunder, then covering the silica coating so produced with an electrically-conductive metal film, and repeating the steps of coating with a polymeric organic insulating material, coating with at least one film of the acidified aqueous solution as described herein, and coating with an electrically-conductive metal film to produce a laminated electrical conductor the conducting portions of which are separated by a layer of polymeric organic electrically-insulating material covered with a coating of silica.

2. The method of making a laminated electrical conductor as described in claim 1 for which said acidified aqueous solution consists of 20 parts by volume of 2-ethoxyethanol, 25 parts by volume of isopropanol, 7.5 parts by volume of tetraethylorthosilicate, and 1 part by volume of 0.5 N formic acid.

References Cited in the file of this patent

UNITED STATES PATENTS

| 2,201,840 | Venable | May 21, 1940 |
| 2,281,602 | Ruben | May 5, 1942 |
| 2,300,072 | Smyers | Oct. 27, 1942 |
| 2,484,242 | Nagel | Oct. 11, 1949 |
| 2,551,864 | Zwelling | May 8, 1951 |
| 2,738,453 | Robinson et al. | Mar. 13, 1956 |

FOREIGN PATENTS

| 635,445 | Great Britain | Apr. 12, 1950 |

OTHER REFERENCES

Industrial and Engineering Chemistry, March 1939, vol. 31, No. 3, pages 334–338. Copy in Scientific Library and in Division 69, 174–110.41.